United States Patent
Mohindra (10) Patent No.: US 7,502,603 B2
(45) Date of Patent: Mar. 10, 2009

(54) DC CANCELLATION IN ZERO-IF RECEIVERS

(75) Inventor: Rishi Mohindra, Milpitas, CA (US)

(73) Assignee: Maxim Integrated Products, Inc., Sunnyvale, CA (US)

(*) Notice: Subject to any disclaimer, the term of this patent is extended or adjusted under 35 U.S.C. 154(b) by 663 days.

(21) Appl. No.: 11/144,430

(22) Filed: Jun. 3, 2005

(65) Prior Publication Data

US 2006/0276153 A1    Dec. 7, 2006

(51) Int. Cl.
    *H04B 1/06*      (2006.01)
(52) U.S. Cl. .............. 455/278.1; 455/63.1; 455/284; 375/319; 375/346
(58) Field of Classification Search .......... 455/232.1, 455/424, 425, 284, 456.5, 456.6, 550.1, 575.1, 455/63.1, 67.11, 239.1–251.1, 296, 295, 455/283, 278.1, 334, 226.1, 136; 375/345, 375/317, 319, 346; 327/307, 309, 310, 311, 327/551, 92, 96, 494, 93, 50, 303, 45, 554, 327/336, 337; 330/129, 279; 370/322, 317
    See application file for complete search history.

(56) References Cited

U.S. PATENT DOCUMENTS

| | | | | |
|---|---|---|---|---|
| 3,603,898 A * | 9/1971 | Dawson et al. ............. 333/173 |
| 4,604,584 A * | 8/1986 | Kelley ........................... 330/9 |
| 5,187,390 A * | 2/1993 | Scott, III ...................... 327/91 |
| 5,274,653 A * | 12/1993 | Ohashi ........................ 372/31 |
| 5,572,154 A * | 11/1996 | Rakers et al. ................. 327/92 |
| 5,748,681 A * | 5/1998 | Comino et al. ............... 375/319 |
| 5,898,912 A * | 4/1999 | Heck et al. ................ 455/234.2 |
| 6,356,749 B1 * | 3/2002 | Rollins et al. ............... 455/334 |
| 6,442,380 B1 * | 8/2002 | Mohindra ................ 455/234.1 |
| 6,498,929 B1 * | 12/2002 | Tsurumi et al. ............. 455/296 |
| 6,771,945 B1 * | 8/2004 | Pickett et al. ............... 455/324 |
| 6,941,121 B2 * | 9/2005 | Chen ........................ 455/232.1 |
| 7,136,000 B1 * | 11/2006 | Hidri et al. .................... 341/122 |
| 7,184,738 B2 * | 2/2007 | Otaka et al. ................. 455/312 |
| 7,295,250 B2 * | 11/2007 | Gomez et al. ............... 348/691 |
| 7,295,820 B2 * | 11/2007 | Shafeeu ...................... 455/136 |
| 2003/0174079 A1 * | 9/2003 | Soltanian et al. ............ 341/118 |
| 2004/0121746 A1 * | 6/2004 | Akamine et al. ............. 455/130 |
| 2005/0093608 A1 * | 5/2005 | Ohtani et al. ............... 327/310 |
| 2006/0240779 A1 * | 10/2006 | Rostami et al. ............ 455/63.1 |
| 2007/0237264 A1 * | 10/2007 | Huang et al. ................ 375/332 |

* cited by examiner

*Primary Examiner*—Duc Nguyen
*Assistant Examiner*—Charles Chow
(74) *Attorney, Agent, or Firm*—Blakely Sokoloff Taylor & Zafman LLP

(57) ABSTRACT

Improved DC cancellation in zero-IF receivers for eliminating the DC offset that otherwise would be caused by the AC voltage on a coupling capacitor at the time of switching from AC coupling to DC coupling. The coupling capacitor normally is connected first as a high pass filter to block any DC component, and then directly coupled as a direct or DC coupler. However any AC component of voltage on the coupling capacitor at the moment of switching normally remains as a DC offset. In accordance with the invention, the component of AC voltage on a coupling capacitor is tracked, and when switched to DC coupling, the component of AC voltage on the capacitor at the time of switching is held and subtracted from the signal path, thereby canceling the DC offset component that otherwise would be caused. Alternate embodiments are disclosed, including embodiments for accelerating capacitance charging for speed-up of the method.

27 Claims, 6 Drawing Sheets

DC CANCELLATION IN ZERO-IF RECEIVERS

BACKGROUND OF THE INVENTION

1. Field of the Invention

The present invention relates to the field of wireless communication.

2. Prior Art

Zero-IF receivers for wireless communication use AC coupling in the I and Q base band signal paths to block the unwanted DC levels due to local oscillator (LO) leakage and circuit implementation. After adjusting the receiver gain, the AC coupling is switched to DC coupling in order to improve the signal to noise ratio (S/N). In doing this, a large DC step may be observed in the I and Q signal paths due to the series capacitor retaining some signal dependent charge existing at the moment of switching. This can result in clipping of the I and Q A/D inputs and also in impairment of the S/N.

Figure 1A:
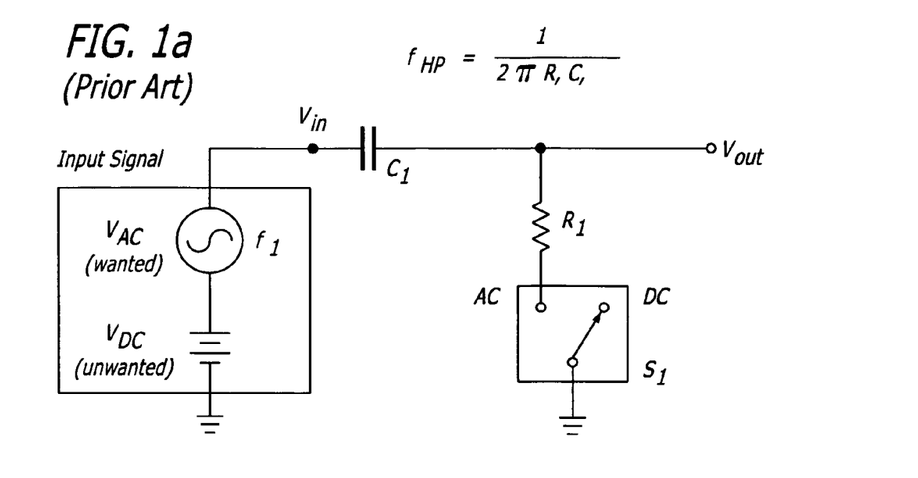
FIG. 1a illustrates a prior art circuit for DC cancellation in a zero-IF receiver for wireless communication.

A prior art circuit for DC cancellation is shown in FIG. 1a. $V_{DC}$ is the unwanted DC offset that is blocked by $C_1$ when the switch S1 is in the AC position. The $R_1C_1$ time constant implements a high-pass filter (AC coupling) with a 3 dB corner frequency $$f_{HP} = \frac{1}{2\pi R_1 C_1}.$$

If the wanted signal has a frequency component $V_{AC}$ at a much lower frequency $f_1 << f_{HP}$, then $C_1$ will charge up close to the instantaneous value of that frequency component in $V_{AC}$ and the AC voltage across $C_1$, i.e., $V_{C_{1AC}}$, will follow that frequency component in $V_{AC}$. When the switch S1 is opened (DC position) for implementing DC coupling, the instantaneous voltage across C1 will be $V_{DC}+V_{C_{1AC}}$ (t=0), assuming the switching is done at time t=0. The $V_{DC}$ component of voltage across the capacitor $C_1$ is the desired blocking of the unwanted DC offsets. However the output $V_{OUT}$ will now have a DC kick equal to $V_{C_{1AC}}$ (t=0), which in the worst case will be nearly as large as the amplitude of $V_{AC}$ at $f_1$.

Figure 1B:
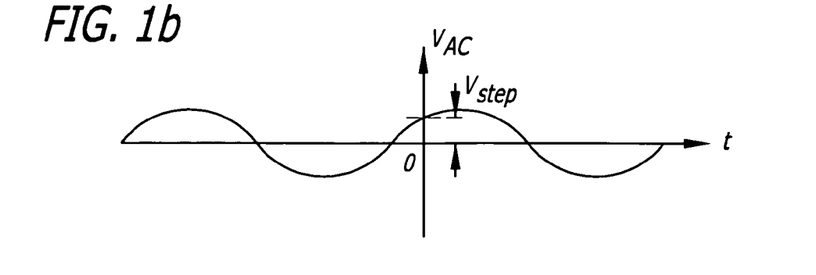
FIG. 1b illustrates a waveform for a wanted signal $V_{AC}$.
Figure 1C:
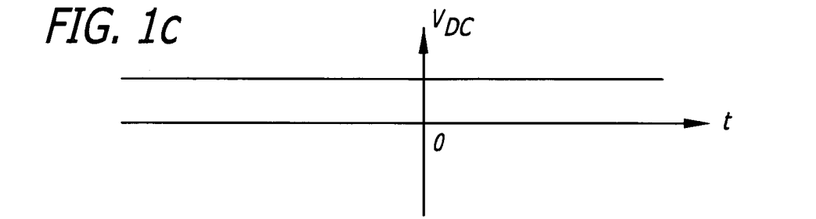
FIG. 1c illustrates an unwanted DC offset $V_{DC}$.
Figure 1D:
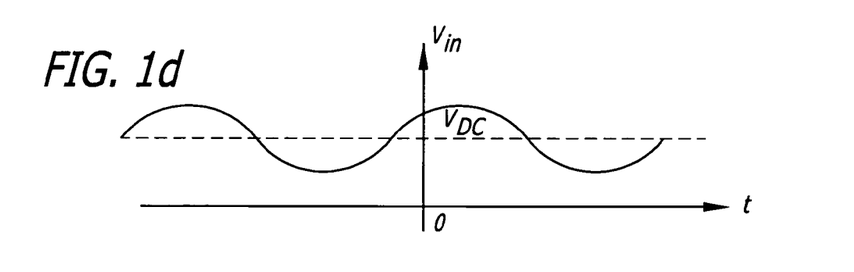
FIG. 1d illustrates the combination of signals of FIGS. 1b and 1c.
Figure 1E:
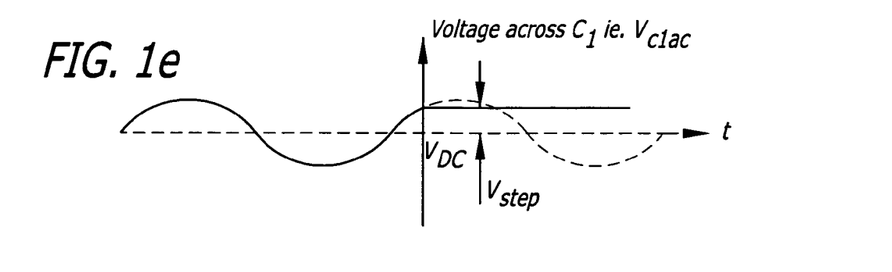
FIG. 1e illustrates the switching to DC coupling at time T=0 when there is an arbitrary part of the signal voltage $V_{IN}$ on the coupling capacitor $C_1$ of FIG. 1.
Figure 1F:
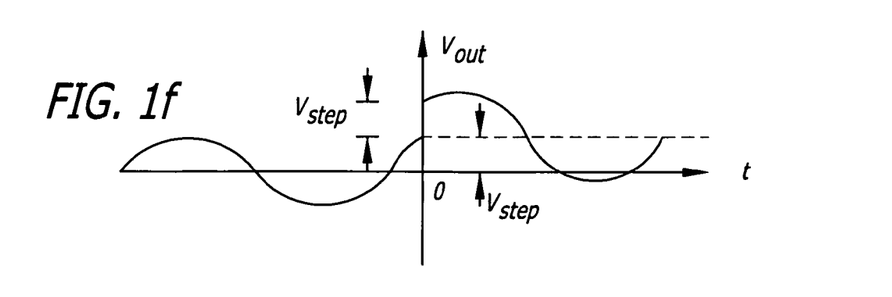
FIG. 1f illustrates the output voltage having a zero average value before t=0, and an average value of $V_{step}$ after t=0.

The applicable waveforms are shown in FIGS. 1b through 1f. FIG. 1b shows the wanted input signal $V_{AC}$, FIG. 1c a representative DC offset level $V_{DC}$, and FIG. 1d, the input voltage $V_{IN}$ to the high pass filter ($R_1,C_1$), which is the sum of the wanted input signal $V_{AC}$ and the representative DC offset level $V_{DC}$. Assuming the wanted signal $V_{IN}$ is at a frequency of $f_1 << f_{HP}$, the voltage $V_{C1ac}$ across the capacitor $C_1$ prior to switching switch S1 (FIG. 1a) to the DC position will substantially follow the wanted signal $V_{IN}$, as shown in FIG. 1e. At the moment of switching (t=0), that signal may have an amplitude anywhere within its maximum amplitude. FIG. 1e illustrates an arbitrary value at the time of switching that is $V_{step}$ above the $V_{DC}$ level. This unwanted DC step of $V_{step}=V_{C_{1AC}}$ (t=0) then is coupled to the next functional element in the signal path, as shown in FIG. 1f.

DETAILED DESCRIPTION OF THE PREFERRED EMBODIMENTS

Figure 2:
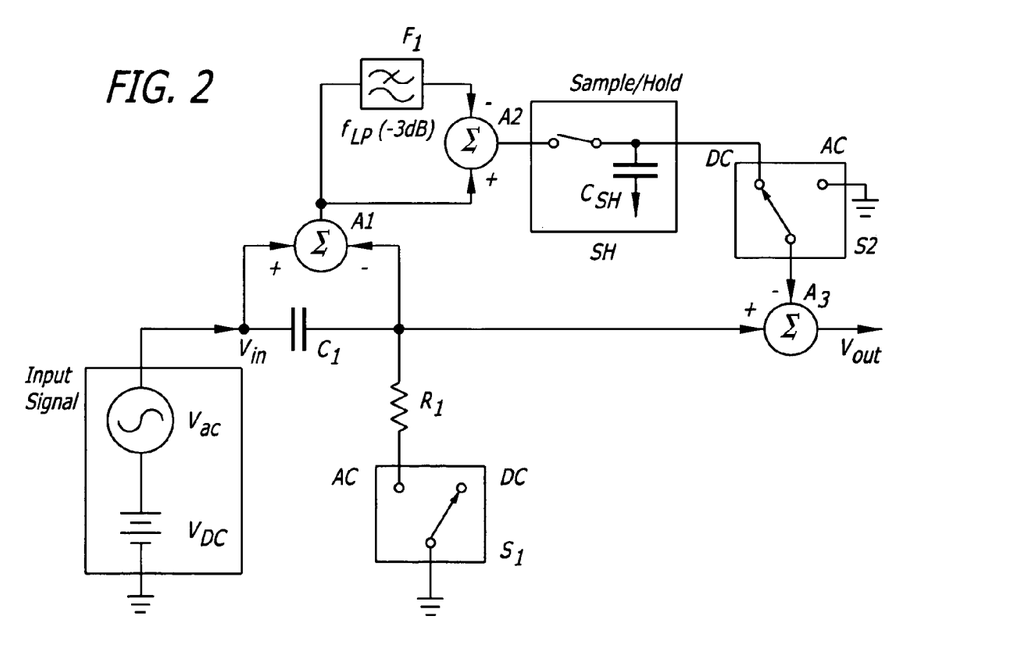
FIG. 2 is a diagram illustrating an embodiment of the present invention.

An embodiment of the present invention DC cancellation circuit shown in FIG. 2 removes the unwanted DC kick of $V_{step}$ that was present in the prior art. According to this invention, the voltage across $C_1$ is measured, and the component of this voltage that corresponds to $V_{step}$ is subtracted at the output. Initially the switches S1 and S2 are in the AC positions, and the Sample/Hold switch is closed. The voltage across the capacitor $C_1$ is monitored by the summing point A1. As before, this voltage may be expressed as $V_{DC}+V_{C_{1AC}}$. However the unwanted $V_{step}$ is simply the value of $V_{C_{1AC}}$ at time t=0. Therefore in order to separate the $V_{step}$ component from the $V_{DC}$ component, the voltage across $C_1$ is low-pas filtered in low pass filter F1 and then subtracted at summing point A2 from the instantaneous voltage that is across $C_1$ to provide the voltage $V_{C_{1AC}}$ to the Sample/Hold capacitor $C_{SH}$ tracking that voltage. The combination of the low pass filter F1 and the summing point A2 acts as a high pass filter.

At t=0, the coupling changes from AC to DC. Switches S1 and S2 change from the AC to the DC positions and the Sample/Hold switch is opened. The Sample/Hold capacitor $C_{SH}$ now holds the output of summing point A2 that existed at t=0, which is the voltage $V_{C_{1AC}}$ at T=0 or $V_{step}$. This value is coupled through switch S2 to summing point A3, and finally subtracted at the output Vout by summing point A3. Thus the voltage $V_{step}$ occurring on switching from AC to DC has also been stored and subtracted from the output Vout, thereby substantially eliminating the effect of $V_{step}$ from the output $V_{vout}$.

Figure 3:
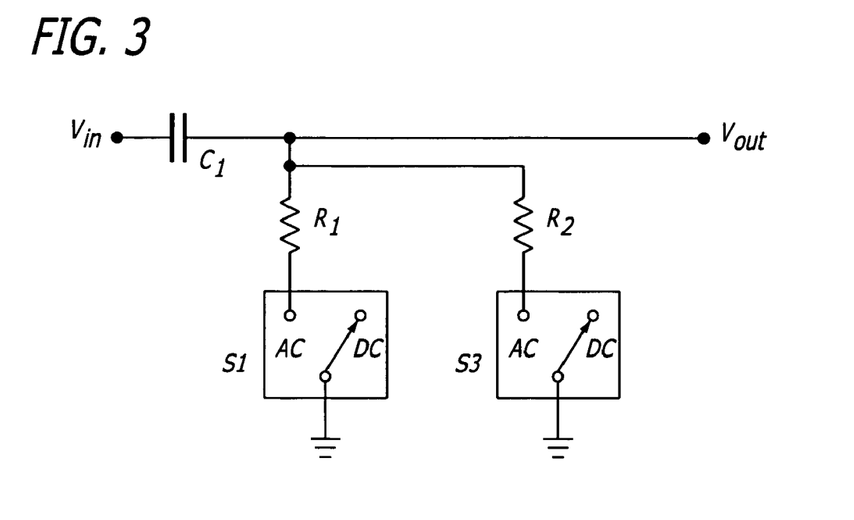
FIG. 3 illustrates a fast settling circuit for high pass filters that may be used with the present invention.

In order to speed up the DC settling of the I and Q receiver base band paths after switching to the receive mode or after changing the front-end RF gain (which produces large changes in $V_{DC}$), the resistor $R_1$ of FIG. 2 may be momentarily made very small as shown in FIG. 3, where a shunt resistor $R_2$ may be momentarily placed in parallel with resistor $R_1$ through switch S3. By doing this, capacitor $C_1$ charges to $V_{DC}$ very quickly with a time constant of approximately $R_2C_1$, which is much smaller than the regular time constant $R_1C_1$ of the high pass filter.

Figure 4A:
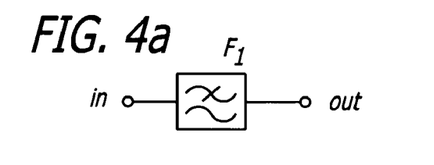
FIGS. 4a through 4c illustrate a conventional low pass filter and a fast settling low pass filter circuit for low pass filters that may be used with the present invention.
Figure 4B:
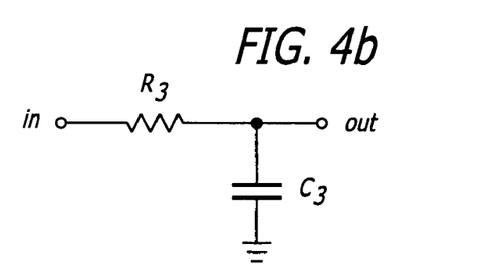

This feature may also be implemented in the low pass filter F1 of FIG. 2. In particular, the low pass filter F1, schematically shown in FIG. 4a, may be implemented as the RC filter $R_3C_3$ of FIG. 4b, though preferably, with the addition of switch S4 and resistor R4 of FIG. 4c, where $R_4<<R_3$ of FIG.

Figure 4C:
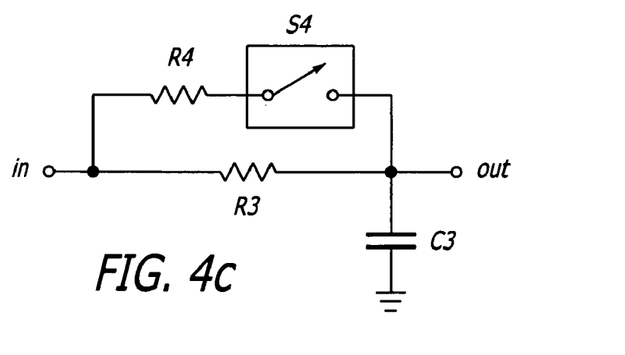

4b, switch S4 may be momentarily closed at time t=0 to implement fast charging in the low pass filter F1.

Figure 5:
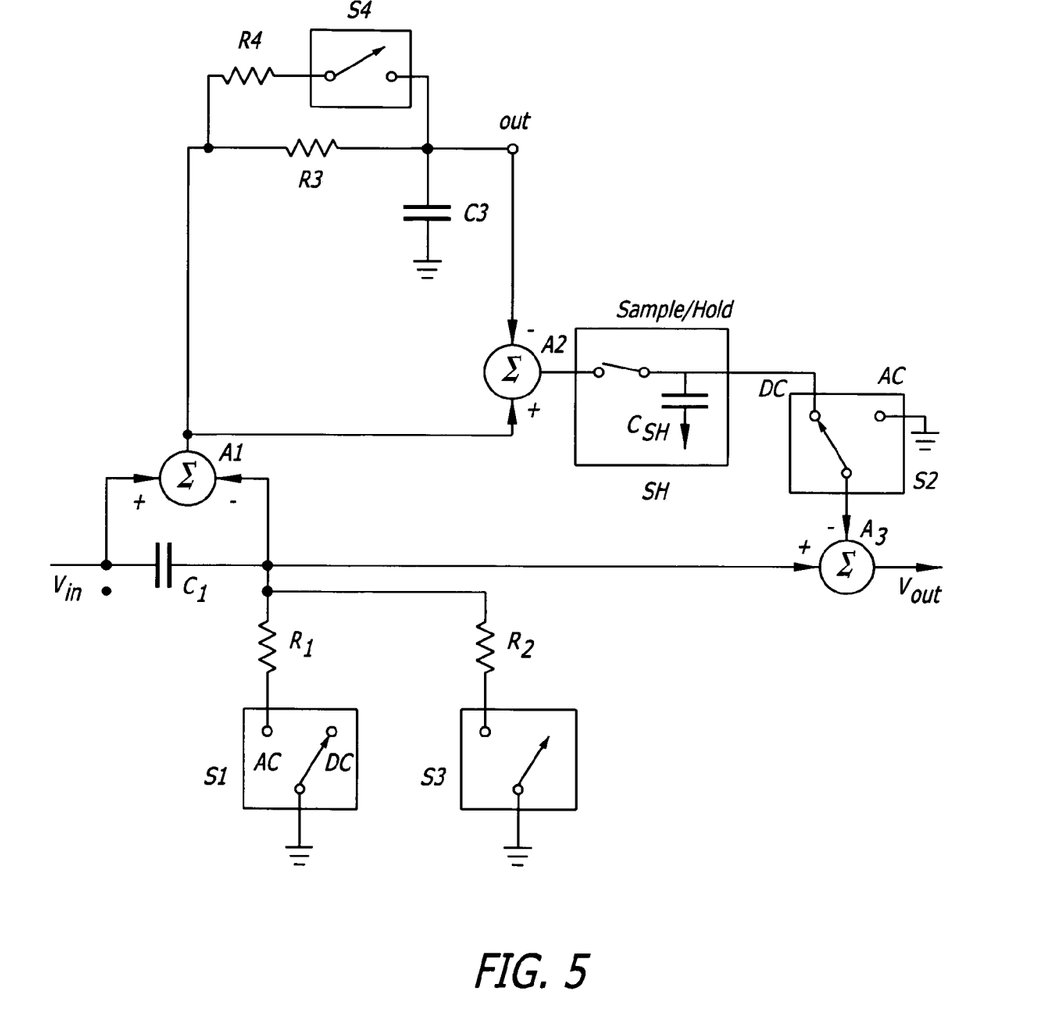
FIG. 5 illustrates in a single Figure, details of a preferred embodiment of the present invention.

FIG. 5 shows the coupling capacitor circuit of FIG. 2 incorporating the fast charging circuits previously described.

Figure 6:
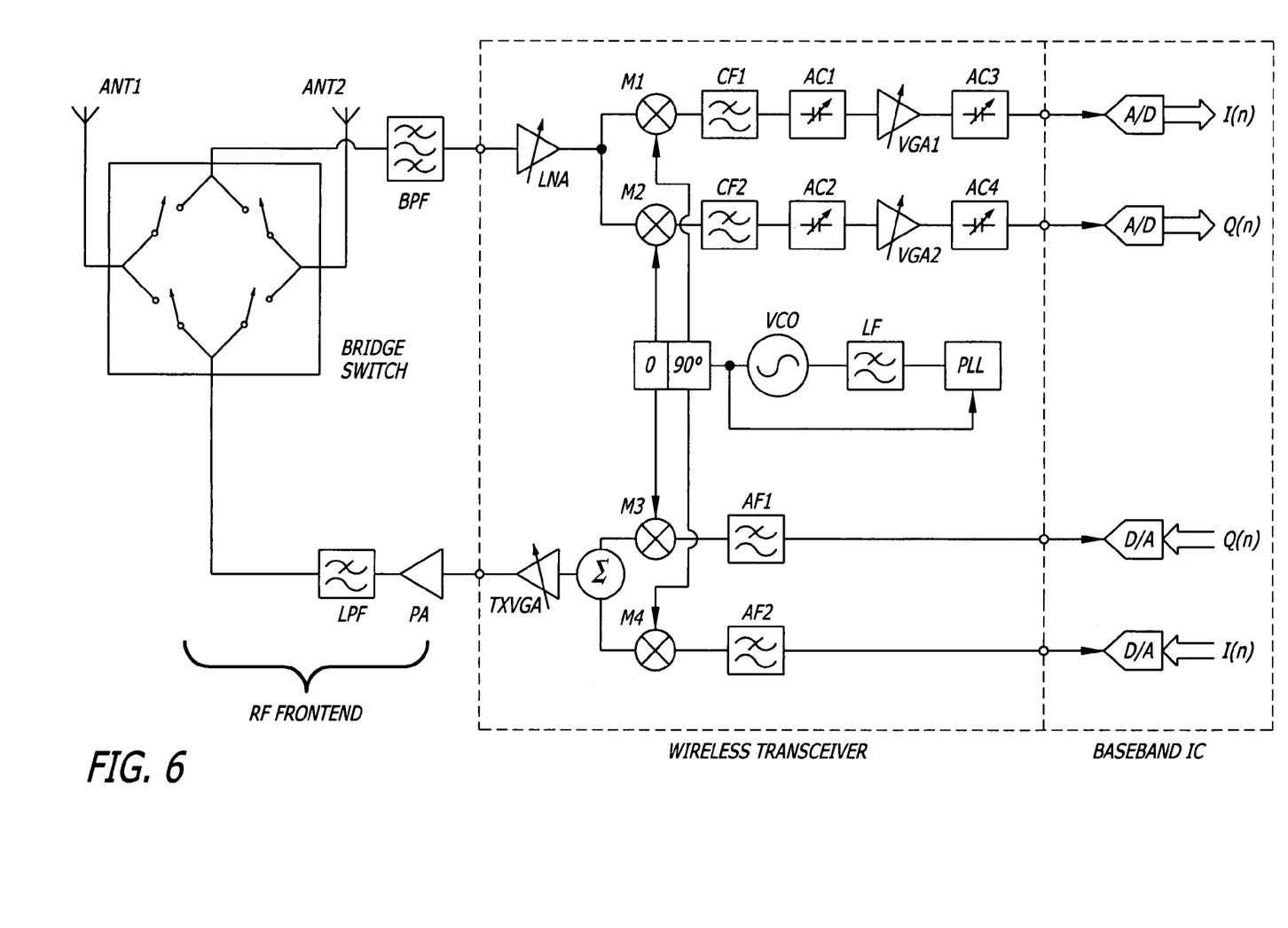
FIG. 6 is a block diagram of an exemplary wireless transceiver incorporating the present invention.
Figure 7:
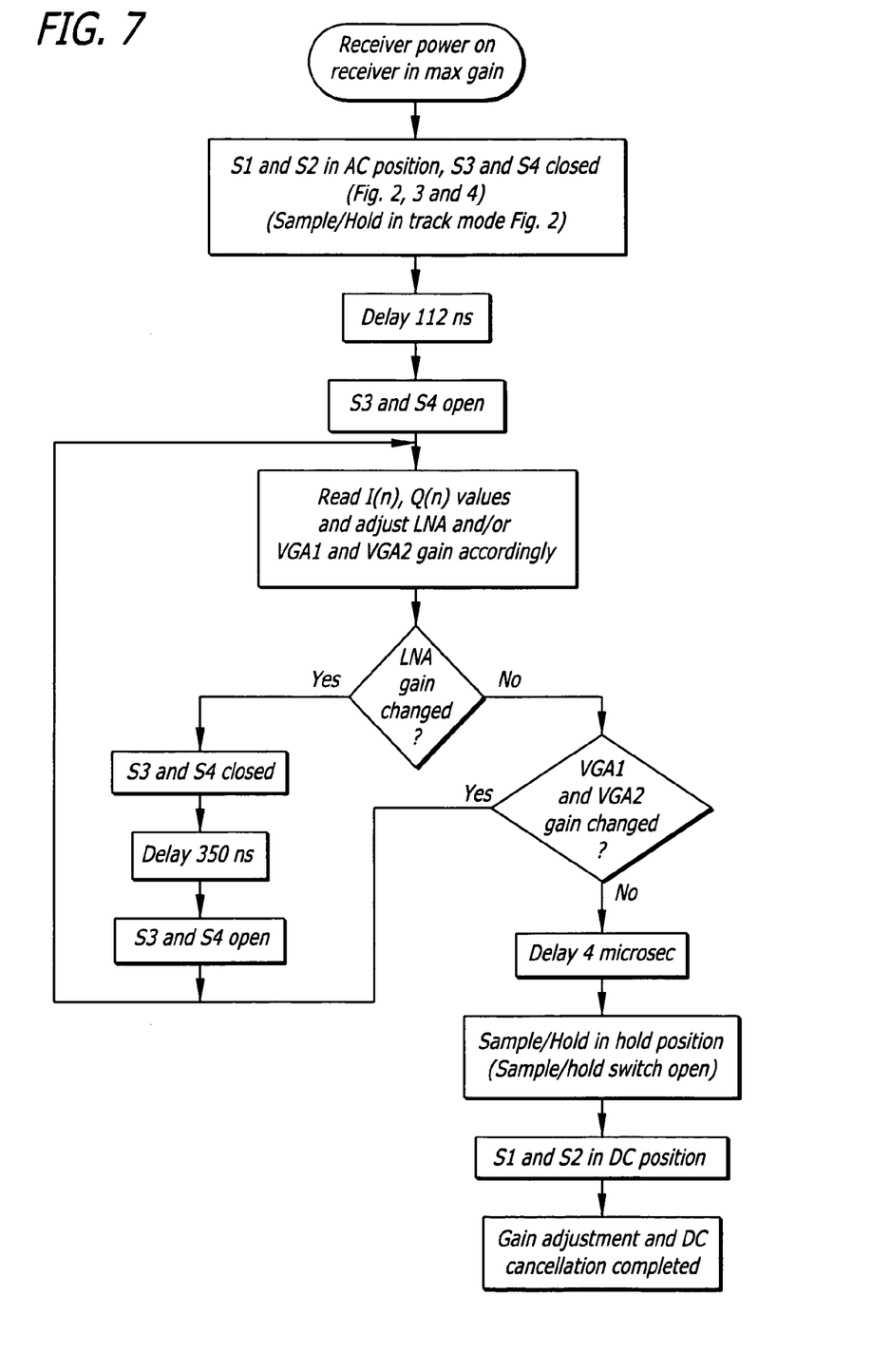
FIG. 7 is an exemplary logic flow diagram for an embodiment of the present invention intended for use in IEEE 802.11a/g WLAN, IEEE802.16, Cellular Phone and Korean WiBro products.

An example of a wireless transceiver incorporating an embodiment of the present invention is shown in FIG. 6. This Figure illustrates a bridge switch for switching between two antennas, though a single antennae may be used as desired. For the transmitter side, the I(n) and Q(n) signals to be transmitted are converted to analog form in the D/A converters, filtered in the filters AF1 and AF2, mixed in mixers M3 and M4 with an RF carrier generated by a voltage controlled oscillator (VCO) controlled through a phase locked loop (PLL), summed, and amplified by variable gain amplifier TXVGA and power amplifier PA, and finally low pass filtered (LPF) for coupling to an antennae.

For the receiver side, a received signal from an antennae is coupled to a band pass filter BPF, through a variable gain low noise amplifier LNA and mixed with the local oscillator frequency in mixers M1 and M2 to directly convert the received RF signal to I and Q base band channel signals. The base band signals are filtered in channel filters CF1 and CF2, dynamically AC and DC coupled by blocks AC1 through AC4, amplified by variable gain amplifiers VGA1 and VGA2 , and then converted to the digital signals I(n) and Q(n) by the A/D converters. The channel filters CF1 and CF2 may be fixed filters, or alternatively, may be programmable filters. In this embodiment, the blocks AC1, AC2, AC3 and AC4 implement the DC cancellation of the present invention, and preferably are generally in accordance with FIG. 5.

Now referring to FIG. 6, a flow chart showing an exemplary sequence of operations for the receiver portion of a wireless transceiver such as that shown in FIG. 5 may be seen. For purpose of specificity, this exemplary sequence of operations is for products conforming to the IEEE 802.11a/g WLAN standards. When the receiver is first turned on, the receiver is set at maximum gain, that is, the gains of the low noise amplifier LNA and of the variable gain amplifiers VGA1 and VGA2 are set at a maximum. Typically the DC offset $V_{DC}$ will equal the wanted signal $V_{AC}$ plus approximately 40 dB. On receiver power turn on, switches S1 and S2 (FIGS. 2 and 5) will be in the AC position and switches S3 and S4 (FIGS. 3, 4 and 5) will be closed for fast charging of the respective capacitors. The Sample/Hold switch (FIGS. 2 and 5) will be closed, putting the Sample/Hold circuit in the track mode, wherein the voltage on the capacitor $C_{SH}$ will track the voltage $V_{C_{LAC}}$.

The switches are left in the stated positions for 112 nanoseconds to allow the capacitors C1 (FIGS. 3 and 5) and C3 (FIGS. 4 and 5) to charge to $V_{DC}$. This time period is approximately seven times the applicable RC time constants, assuming RC time constant is approximately 16 nanoseconds, or the high pass corner frequency $F_{HP}$ is 10 megahertz. At the end of the 112 nanosecond delay, switches S3 and S4 are opened to put the receiver in the normal AC coupled mode, wherein the receiver is ready for signal acquisition. When the switches S3 and S4 are open, the low pass filter corner frequency $F_{LP}$ equals 112 KHz and the high pass filter corner frequency is 600 KHz. Also by this time, the DC offset output to the A/D converters will be approximately equal to $V_{AC}$–20 dB.

Now the inphase and quadrature channel values are read, typically through the output of the A/D converters, and the gain of the receiver is adjusted. In that regard, such adjustment may be by way of adjusting the gain of the low noise amplifier LNA or the variable gain amplifiers VGA1 and VGA2, or a combination of the two, normally in accordance with a predetermined regimen. If the low noise amplifier LNA gain has changed, the DC offset in the output can change by as much as 30 dB. Consequently, in accordance with the sequence being described, switches S3 and S4 (FIGS. 3, 4 and 5) are turned on for 350 nanoseconds for fast charging of the respective capacitors, after which switches S3 and S4 are turned off and the inphase and quadrature values are again measured and gain adjusted, if required. If the gain of the low noise amplifier LNA is adjusted again, this loop again repeats. If it was not adjusted or changed, but the gain of the variable gain amplifiers VGA1 and VGA2 was changed, the inphase and quadrature values are again read and further gain adjustments are made, if necessary. Because the variable gain amplifiers VGA1 and VGA2 do not inject significant DC offset in the system, fast DC offset zeroing is not again required after their gain has been changed.

In order to adequately read the inphase and quadrature values for gain control purposes, once no further changes in the gain of the low noise amplifier LNA or in the variable gain amplifiers VGA1 and VGA2 are made, a delay of approximately 4 microseconds is imposed, which delay represents the remaining time available in the short sequence of the OFDM packet heading of the IEEE 802.11 specification. The 4 microsecond delay is required for the output of F1 to settle to $V_{DC}$, so that a more accurate AC component estimate is available at A2 output at t=0. Thereafter, the sample/hold switch is opened to hold the voltage equal to $V_{step}$ on the capacitor $C_{SH}$ and switches S1 and S2 are changed to the DC position. With switch S2 in the DC position, the DC voltage $V_{step}$ that happened to exist on capacitor C1 (FIG. 2) is subtracted from the output Vout, completing the gain adjustment and DC cancellation.

In the above embodiment, gain adjustments are made based on the I and Q value read at the output of the A/D converters. Alternatively or in addition, an RSSI (received signal strength indicator) circuit may be used. Such circuits normally monitor the analog signal strength prior to the A/D converters and provide an output responsive to the log of the signal level. Such circuits are not as accurate as using the output of the A/D converters, though could be used, or alternatively, could be used for course gain correction, with the output of the A/D converters being used for the final gain corrections.

Thus in accordance with the present invention, DC components appearing at the input to a coupling capacitor are blocked as in the prior art. However in addition, the instantaneous AC component that may appear across the coupling capacitor at the time of switching to DC coupling is sensed, held and subtracted from the signal path, eliminating the additional DC offset component that would otherwise be imposed by that AC component. Embodiments of the invention disclosed herein subtract the voltage component from the signal path after the point of sensing the voltage across the coupling capacitor, though this is not a limitation of the invention, as the correction could be made at a point in the signal path prior to the point of sensing the voltage across the coupling capacitor, provide care was taken to not subtract the corrective value prior to decoupling the sample and hold capacitor from the signal path. Also embodiments of the present invention hereinbefore described have been described with respect to the IEEE 802.11a/g WLAN standards. However the invention is applicable to other direct conversion wireless applications also. By way of example, for CDMA cell phones using FDD (frequency division duplexing), the receiver gain is controlled from the base station in a closed loop, with an update rate of less than 1 kHz, i.e. an update interval of less than 1000 μsec. Every time the receiver gain is to be changed, the I and Q receive paths are switched to the AC-coupling mode hereinbefore described just before the actual gain change is done. For WCDMA, the AC coupling can be 100-200 kHz (−3 dB corner) to enable fast settling of gain and DC offsets (that are due to gain changes). About 10-20 μsec after gain is changed, the I and Q paths are switched back to DC coupling. The 10-20 μsec is sufficient to bring the output of F1 (FIG. 2) to the new input DC condition, in order to produce a more accurate signal estimate at A2 output for sampling by $C_{SH}$. Fast charging can also be enabled momentarily in the beginning of the 10-20 μsec interval, for both C1 and C3. The 10-20 μsec AC coupling of 100-200 kHz every 1000 μsec does not significantly hurt the speech quality of WCDMA. By removing the DC step of the prior art, it actually improves the speech quality. Thus while certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A method of removing DC offsets in a signal path of a zero-if receiver having a low noise amplifier for coupling to an antenna, at least one mixer coupled to an output of the low noise amplifier, a variable gain amplifier, a first coupling capacitor having a first terminal coupled to an output of the mixer and a second terminal coupled to an input to a variable gain amplifier, the second terminal of the first coupling capacitor being controllably coupleable to a circuit ground through a first resistor by a first switch, comprising:

on applying power to the receiver, closing the first switch and coupling a first sample and hold capacitor to track an AC voltage across the first coupling capacitor;

opening the first switch and decoupling the first sample and hold capacitor to retain the voltage across the first coupling capacitor in the first sample and hold capacitor at the time of opening the first switch; and, subtracting the voltage retained on the first sample and hold capacitor from the signal path.

2. The method of claim 1 wherein the voltage retained on the first sample and hold capacitor is subtracted from the voltage on the second terminal of the first coupling capacitor.

3. The method of claim 1 further comprising:

before opening the first switch, coupling and then decoupling a second resistor across the first resistor, the second resistor having a lower resistance than the first resistor.

4. The method of claim 1 further comprising:

after changing the gain of the low noise amplifier, closing the first switch and coupling a sample and hold capacitor to track the AC voltage across the first coupling capacitor;

opening the first switch and decoupling the sample and hold capacitor to retain the voltage across the first coupling capacitor in the sample and hold capacitor at the time of opening the first switch; and, subtracting the voltage retained on the sample and hold capacitor from the signal path.

5. The method of claim 1 wherein the receiver includes an inphase and a quadrature channel, each channel having at least one mixer coupled to an output of the low noise amplifier, a variable gain amplifier, a coupling capacitor having a first terminal coupled to an output of the mixer and a second terminal coupled to an input to a variable gain amplifier, the second terminal of the coupling capacitor being controllably coupleable to a circuit ground through a first resistor by a switch, and further comprising practicing the method simultaneously for both channels.

6. The method of claim 1 wherein the zero-IF receiver has a second coupling capacitor having a first terminal coupled to an output of a second variable gain amplifier and a second terminal coupled to a receiver output, the second terminal of the second coupling capacitor being controllably coupleable to a circuit ground through a second resistor by a second switch, the method further comprising:

on applying power to the receiver, closing the second switch and coupling a second sample and hold capacitor to track an AC voltage across the second coupling capacitor;

opening the second switch and decoupling the second sample and hold capacitor to retain the voltage across the second coupling capacitor in the second sample and hold capacitor at the time of opening the second switch; and, subtracting the voltage retained on the second sample and hold capacitor from the voltage on the second terminal of the second coupling capacitor.

7. A method of removing DC offsets in a signal path of a zero-IF receiver having a low noise amplifier for coupling to an antenna, at least one mixer coupled to an output of the low noise amplifier, a variable gain amplifier, a first coupling capacitor having a first terminal coupled to an output of the mixer and a second terminal coupled to an input to a variable gain amplifier, the second terminal of the first coupling capacitor being controllably coupleable to a circuit ground through a first resistor by a first switch, comprising:

on applying power to the receiver, closing the first switch and coupling a first sample and hold capacitor to track an AC voltage across the first coupling capacitor;

opening the first switch and decoupling the first sample and hold capacitor to retain the voltage across the first coupling capacitor in the first sample and hold capacitor at the time of opening the first switch; and, subtracting the voltage retained on the first sample and hold capacitor from the signal path;

wherein the voltage across the first coupling capacitor is low pass filtered and subtracted from the unfiltered voltage across the first coupling capacitor, the result of the subtraction being coupled to the sample and hold capacitor to track the AC voltage across the first coupling capacitor when the first switch is closed.

8. The method of claim 7 wherein the low pass filter is an RC filter, and further comprising:

before opening the first switch, coupling and then decoupling a second resistor across the first resistor, the second resistor having a lower resistance than the first resistor, and coupling and then decoupling a third resistor across a resistor in the low pass filter, the third resistor having a lower resistance than the resistor in the low pass filter.

9. A method of removing DC offsets in a signal path of a zero-IF having a low noise amplifier for coupling to an antenna, at least one mixer coupled to an output of the low noise amplifier, a variable gain amplifier, a first coupling capacitor having a first terminal coupled to an output of the mixer and a second terminal coupled to an input to a variable gain amplifier, the second terminal of the first coupling capacitor being controllably coupleable to a circuit ground through a first resistor by a first switch, comprising:

on applying power to the receiver, closing the first switch and coupling a first sample and hold capacitor to track an AC voltage across the first coupling capacitor;

opening the first switch and decoupling the first sample and hold capacitor to retain the voltage across the first coupling capacitor in the first sample and the hold capacitor at the time of opening the first switch; and subtracting the voltage retained on the first sample and hold capacitor from the signal path;

wherein the zero-IF receiver has a second coupling capacitor having a first terminal coupled to an output of a second variable gain amplifier and second terminal coupled to a receiver output of a second terminal of the second coupling capacitor being controllably coupleable to a circuit ground through a second resistor switch, the method further comprising:

on applying power to the receiver, closing the second switch and coupling a second sample and hold capacitor to track AC voltage across the second coupling capacitor;

opening the second switch and decoupling the second sample and hold capacitor to retain the voltage across the second coupling capacitor in the second sample and hold capacitor at the time of opening the second switch; and, subtracting the voltage retained on the second sample and hold capacitor from the voltage on the second terminal of the second coupling capacitor; and, before opening the first and second switches, coupling and then decoupling third and fourth resistors across the first and second resistors, respectively, the third and fourth resistors having lower resistances than the first and second resistors, respectively.

10. The method of claim 9 wherein the voltages across the first and second coupling capacitors are low pass filtered and subtracted from the respective unfiltered voltages across the first and second coupling capacitors, the result of the subtraction being coupled to the respective sample and hold capacitor to track the AC voltages across the first and second coupling capacitors when the first and second switches are closed.

11. The method of claim 10 wherein the low pass filters are RC filters, and further comprising:

before opening the first and second switches, coupling and then decoupling fifth and sixth resistors, respectively, across the first and second resistors, the fifth and sixth resistors having lower resistances than the first and second resistors, and coupling and then decoupling seventh and eighth resistors across the respective resistor in the respective low pass filters, the seventh and eighth resistors having lower resistances than the resistors in the low pass filters.

12. A method of removing DC offsets in a signal path of a zero-IF receiver having a low noise amplifier for coupling to an antenna, at least one mixer coupled to an output of the low noise amplifier, a variable gain amplifier, a first coupling capacitor having a first terminal coupled to an output of the mixer and a second terminal coupled to an input to a variable gain amplifier, the second terminal of the first coupling capacitor being controllably coupleable to a circuit ground through a first resistor by a first switch, comprising:

on adjusting the gain of the low noise amplifier, closing the first switch and coupling a first sample and hold capacitor to track an AC voltage across the first coupling capacitor;

opening the first switch and decoupling the first sample and hold capacitor to retain the voltage across the first coupling capacitor in the first sample and hold capacitor at the time of opening the first switch; and, subtracting the voltage retained on the first sample and hold capacitor from the signal path.

13. The method of claim 12 wherein the voltage retained on the first sample and hold capacitor is subtracted from the voltage on the second terminal of the first coupling capacitor.

14. The method of claim 12 further comprising:

before opening the first switch, coupling and then decoupling a second resistor across the first resistor, the second resistor having a lower resistance than the first resistor.

15. The method of claim 12 wherein the receiver includes an inphase and a quadrature channel, each channel having at least one mixer coupled to an output of the low noise amplifier, a variable gain amplifier, a coupling capacitor having a first terminal coupled to an output of the mixer and a second terminal coupled to an input to a variable gain amplifier, the second terminal of the coupling capacitor being controllably coupleable to a circuit ground through a first resistor by a switch, and further comprising practicing the method simultaneously for both channels.

16. The method of claim 12 wherein the zero-IF receiver has a second coupling capacitor having a first terminal coupled to an output of the variable gain amplifier and a second terminal coupled to a receiver output, the second terminal of the second coupling capacitor being controllably coupleable to a circuit ground through a second resistor by a second switch, the method further comprising:

on applying power to the receiver, closing the second switch and coupling a second sample and hold capacitor to track the AC voltage across the second coupling capacitor;

opening the second switch and decoupling the second sample and hold capacitor to retain the voltage across the second coupling capacitor in the second sample and hold capacitor at the time of opening the second switch; and, subtracting the voltage retained on the second sample and hold capacitor from the signal path.

17. A method of removing DC offsets in a signal path of zero-IF receiver having low noise amplifier for coupling to an antenna, at least on mixer coupled to an output of the low noise amplifier, a variable gain amplifier, a first coupling capacitor having a first terminal coupled to an output of the mixer and a second terminal coupled to an input to a variable gain amplifier, the second terminal of the first coupling capacitor being controllably coupleable to a circuit ground through a first resistor by a first switch, comprising:

on adjusting the gain of the low noise amplifier, closing the first switch and coupling a first sample and hold capacitor to track an AC voltage across the first coupling capacitor;

opening the first switch and decoupling the first sample and hold capacitor to retain the voltage across the first coupling capacitor in the first sample and hold capacitor at their time of opening the first switch; and, subtracting the voltage retained on the first sample and hold capacitor from the signal path.

18. The method of claim 17 wherein the low pass filter is an RC filter, and further comprising:

before opening the first switch, coupling and then decoupling a second resistor across the first resistor, the second resistor having a lower resistance than the first resistor, and coupling and then decoupling a third resistor across a resistor in the low pass filter, the third resistor having a lower resistance than the resistor in the low pass filter.

19. A method of removing DC offsets in a signal path of a zero-IF receiver having a low noise amplifier for coupling to an antenna, at least one mixer coupled to an output of the low noise amplifier for variable gain amplifier, a first coupling capacitor having a first terminal coupled to an output of the mixer and a second terminal coupled to an input to a variable gain amplifier, the second terminal of the first coupling capacitor being controllably coupleable to a circuit ground through a first resistor by first switch comprising:

on adjusting the gain of the low noise amplifier, closing the first switch and coupling a first sample and hold capacitor to track an AC voltage across the first coupling capacitor;

opening the first switch and decoupling the first sample and hold capacitor to retain the voltage across the first coupling capacitor in the first sample and hold capacitor at the time of opening the first switch; and subtracting the voltage retained on the first sample and hold capacitor from the signal path;

wherein the zero-IF receiver has a second coupling capacitor having first terminal coupled an output variable gain amplifier and a second terminal coupled to a receiver output, second terminal of the second coupling capacitor being controllably coupleable to a circuit ground through a second resistor by a second switch, the method further comprising:

on applying power to the receiver, closing the second switch and coupling a second sample and hold capacitor to track the AC voltage across the second coupling capacitor;

opening the second switch and decoupling the second sample and hold capacitor to retain the voltage across the second coupling capacitor in the second sample and hold capacitor at the time of opening the second switch; and subtracting the voltage retained on the second sample and hold capacitor from the signal path; and before opening the first and second switches, coupling and then decoupling third and fourth resistors across the first and second resistors, respectively, the third and fourth resistors having lower resistances than the first and second resistor, respectively.

20. A method of removing DC offsets in the I and Q signal paths in a zero-IF receiver having a low noise amplifier for coupling to an antenna, I and Q mixers coupled to an output of the low noise amplifier, each mixer having a first coupling capacitor having a first terminal coupled to an output of the mixer and a second terminal coupled to an input to a variable gain amplifier, the second terminal of the first coupling capacitors each being controllably coupleable to a circuit ground through a respective first resistor by a respective first switch, comprising:

on applying power to the receiver, closing the first switches and coupling a first pair of sample and hold capacitors, each to track a respective AC voltage across a respective first coupling capacitor;

opening the first switches and decoupling the sample and hold capacitors to retain the voltages across the first coupling capacitors in the respective sample and hold capacitors at the time of opening the first switches; and, subtracting the voltages retained on the first sample and hold capacitors from the respective I and Q signal paths.

21. The method of claim 20 wherein the voltages retained on the sample and hold capacitors are subtracted from the voltages on the second terminal of the respective coupling capacitor.

22. The method of claim 20 further comprising:

after changing the gain of the low noise amplifiers, closing the first switches and coupling sample and hold capacitors to track the AC voltages across the first coupling capacitors;

opening the first switches and decoupling the sample and hold capacitors to retain the voltages across the first coupling capacitors in the sample and hold capacitors at the time of opening the first switches; and, subtracting the voltage retained on the sample and hold capacitor from the I and Q signal path.

23. The method of claim 20 wherein the I and Q signal paths each have a second coupling capacitor having a first terminal coupled to an output of a second variable gain amplifier and a second terminal coupled to a receiver output, the second terminal of the second coupling capacitor being controllably coupleable to a circuit ground through a respective second resistor by a respective second switch, the method further comprising:

on applying power to the receiver, closing the second switches and coupling second sample and hold capacitors to track the AC voltages, each across a respective second coupling capacitor;

opening the second switches and decoupling the second sample and hold capacitors to retain the voltages across the second coupling capacitors in the second sample and hold capacitors at the time of opening the second switch; and, subtracting the voltages retained on the second sample and hold capacitors, each from a respective signal path.

24. A method of removing DC offsets in the I and Q signal paths in a zero-IF receiver having a low noise amplifier for coupling to an antenna, I and Q mixers coupled to an output of the low noise amplifier, each mixer and a second terminal coupled to an input to a variable gain amplifier, the second terminal of the first coupling capacitors each being controllably coupleable to a circuit ground through a respective first resistor by a respective first switch, comprising:

on applying power to the receiver, closing the first switches and coupling a first pair of sample and hold capacitors, each to track a respective AC voltage across a respective first coupling capacitor;

opening the first switches and decoupling the sample and hold capacitors to retain the voltages across the first coupling capacitors in the respective sample and hold capacitors at the time of opening the first switches; and subtracting the voltages retained on the first sample and hold capacitors from the respective I and Q signal paths;

wherein before opening the first switches, coupling and then decoupling two second resistors, each across a respective of the first resistors, the second resistors having a lower resistance than the first resistors.

25. A method of removing DC offsets in the I and Q signal paths in a zero-IF receiver having low noise amplifier for coupling to an antenna, I and Q mixers coupled to an output of the low noise amplifier, each mixer having a first coupling capacitor having a first terminal coupled to an output of the mixer and second terminal coupled to an input to a variable gain amplifier, the second terminal of the first coupling capacitors each being controllably coupleable to a circuit ground through a respective first resistors by a respective first switch, comprising:

on applying power to the receiver, closing the first switches and coupling a first pair of sample and hold capacitors, each to track a respective AC voltage across a respective first coupling capacitor;

opening the first switches and decoupling the sample and hold capacitors to retain the voltages across the first coupling capacitors in the respective sample and hold capacitors at the time of opening the first switches; and, subtracting the voltages retained on their first sample and hold capacitors from the respective I and Q signal paths;

wherein the voltages across the first coupling capacitors are low pass filtered and subtracted from the unfiltered voltages across the first coupling capacitors, the result of the subtractions being coupled to the sample and hold capacitors to track the AC voltages across the first coupling capacitors when the first switches are closed.

26. The method of claim 25 wherein the low pass filter is an RC filter, and further comprising:

before opening the first switches, coupling and then decoupling a respective second resistor across each of the first resistors, the second resistors having a lower resistance than the first resistors, and coupling and then decoupling a respective third resistor across a resistor in each of the low pass filters, the third resistors having a lower resistance than the resistors in the low pass filters.

27. A method of removing DC offsets in the I and Q signal paths in a zero-IF receiver having a low noise amplifier for coupling to an antenna, I and Q mixers coupled to an output of the low noise amplifier, each mixer having a first coupling capacitor having a first terminal coupled to an output of the mixer and a second terminal coupled to an input to a variable gain amplifier, the second terminal of the first coupling capacitors each being controllably coupleable to a circuit ground through receiver first resistor by a respective first switch, comprising:

on applying power to the receiver, closing the first switches and coupling a first air of sample and hold capacitors, each to track a respective AC voltage across a respective first coupling capacitor;

opening the first switches and decoupling the sample and hold capacitors to retain the voltages across the first coupling capacitors in the respective sample and hold capacitors at the time of opening the first switches; and subtracting the voltages retained on the first sample and hold capacitors from the respective I and Q signal paths;

wherein the I and Q signal paths each have a second coupling capacitor having a first terminal coupled to an output of a second variable gain amplifier and a second terminal coupled to a receiver output, the second terminal of the second coupling capacitor being controllably coupleable to a circuit ground though respective second resistor by a respective second switch, the method further comprising:

applying power to the receiver, closing the second switches and coupling second sample and hold capacitors to track the AC voltages, each across a respective second coupling capacitor;

opening the second switches and decoupling the second sample and hold capacitors to retain the voltages across the second coupling capacitors in the second sample and hold capacitors at the time of opening the second switch; and, subtracting the voltages retained on the second sample and hold capacitors, each from a respective signal path and, wherein, before opening the first and second switches, coupling and then decoupling third and fourth resistors across the first and second resistors, respectively, the third and fourth resistors having lower resistances than the first and second resistor, respectively.

* * * * *